United States Patent [19]

Biblarz et al.

[11] 4,328,436
[45] May 4, 1982

[54] OPTIMALLY LOADED ELECTROHYDRODYNAMIC POWER GENERATOR

[75] Inventors: Oscar Biblarz; Theodore H. Gawain, both of Carmel, Calif.

[73] Assignee: The United States of America as represented by the Secretary of the Navy, Washington, D.C.

[21] Appl. No.: 128,593

[22] Filed: Mar. 10, 1980

[51] Int. Cl.³ .......................................... H02K 45/00
[52] U.S. Cl. .................................................. 310/11
[58] Field of Search ...................... 310/10, 11, 308, 309

[56] References Cited

U.S. PATENT DOCUMENTS

| | | | |
|---|---|---|---|
| 3,201,622 | 8/1965 | Thring | 310/11 |
| 3,417,267 | 12/1968 | Marks | 310/309 |
| 3,524,086 | 8/1970 | Lindley | 310/11 |
| 3,736,447 | 5/1973 | Zauderer | 310/11 |
| 3,792,340 | 2/1974 | Sheinkman et al. | 310/11 X |
| 3,811,057 | 5/1974 | Brown | 310/11 |

*Primary Examiner*—Donovan F. Duggan
*Attorney, Agent, or Firm*—R. F. Beers; Charles D. B. Curry; Francis I. Gray

[57] ABSTRACT

An optimally loaded electrohydrodynamic power generator which provides a uniform maximum loading throughout an EHD conversion channel. The channel between the injector and collector is in the form of a slender, converging-diverging nozzle of a shape defined by the following pair of parametric equations:

$$\frac{r}{r_1} = \left[ \frac{1 + \frac{\gamma - 1}{2} M^2}{\frac{\gamma + 1}{2}} \right]^{\frac{(\gamma+1)}{4(\gamma-1)}} \frac{1}{\sqrt{M}} \text{ and}$$

$$\frac{z}{\lambda} = \frac{1}{\gamma - 1} \ln\left[ 1 + \frac{\gamma - 1}{2} M^2 \right]$$

where
- r = nozzle radius at station z,
- $r_1$ = nozzle radius at throat,
- γ = ratio of specific heats,
- M = Mach number at station z,
- λ = characteristic length,
- z = axial coordinate.

1 Claim, 1 Drawing Figure

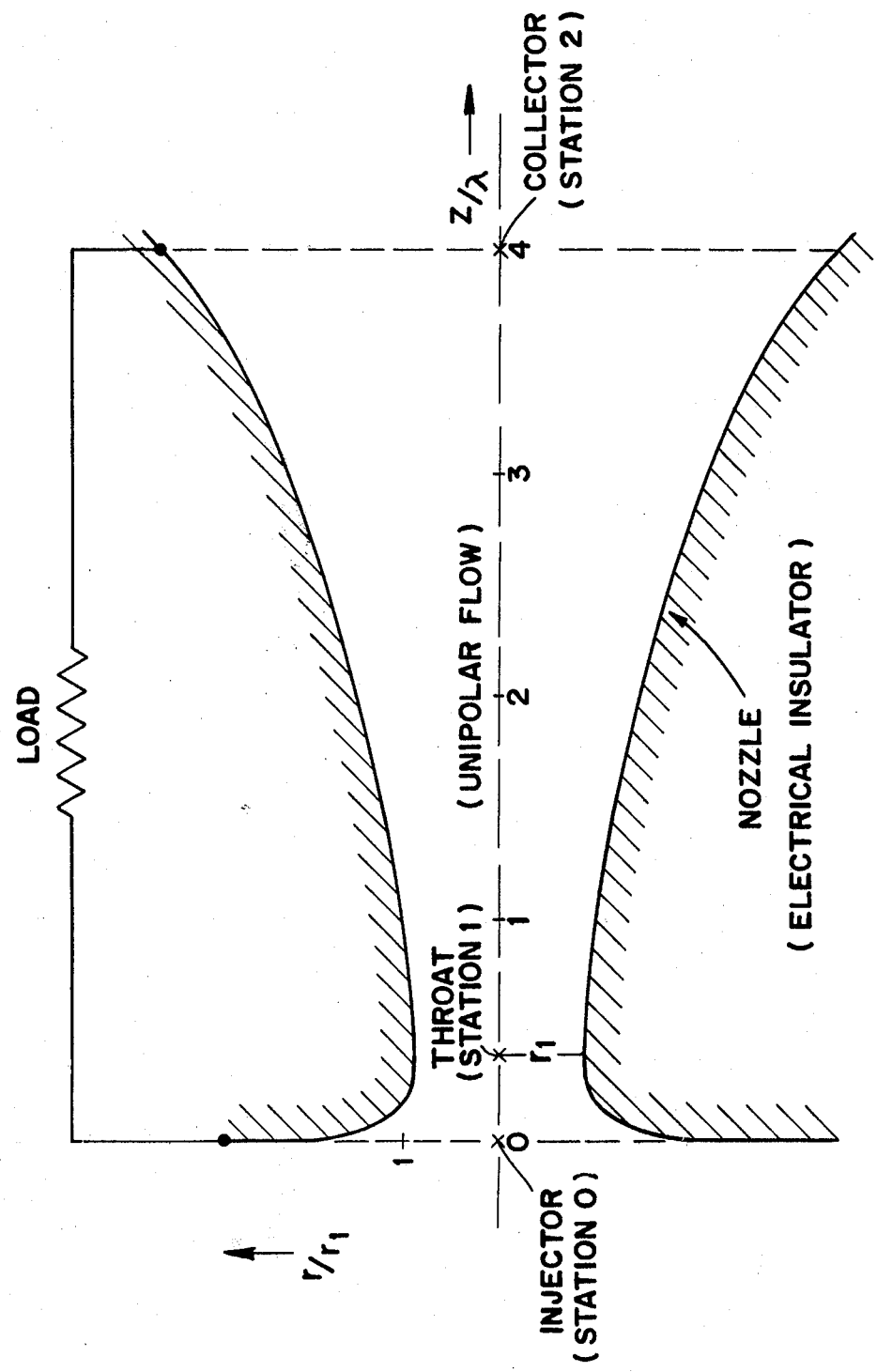

OPTIMALLY LOADED ELECTROHYDRODYNAMIC POWER GENERATOR

BACKGROUND OF THE INVENTION

1. Field of the Invention

The present invention relates to electrical power generators, and more particularly to an optimum channel or nozzle configuration for a device generating useful electrical power by means of an electrohydrodynamic (EHD) process.

2. Description of Prior Art

An EHD device uses the flow of fluid, usually a gas such as air or water vapor, in which are entrained a very large number of very fine and well distributed solid or liquid particles, such as water droplets as in an aerosol spray, the particles being electrically charged and of one polarity. The fluid flows through a nozzle-like channel by the imposition of a suitable pressure drop. The charged particles are introduced into the fluid flow by a suitable injector upstream of the nozzle-like channel input and are removed from the flow by a suitable collector at some downstream location. (See U.S. Pat. No. 3,777,564 entitled "Electrogasdynamic Spectral Anemometer" issued to Oscar Biblarz on Dec. 11, 1973 and co-pending U.S. patent application Ser. No. 93,790 entitled "Changing Mechanisms for Electrogasdynamic Spectral Anemometer" filed by Oscar Biblarz on Nov. 13, 1979 for examples of charging and collecting mechanisms.) The charged particles constitute an electrical current moving through an electrical field which exerts forces upon the particles in a direction and sense opposed to the general fluid motion. Work results from moving the particles against the resistance of the electrical forces which causes a corresponding decrease in the total enthalpy of the fluid stream. The work creates a difference in electrical potential between the input and the output which are connected to an external useful electrical load. Thus, the enthalpy drop of the fluid is converted into a useful electrical power output without the use of any major rotating or reciprocating components.

The performance of an EHD device is limited by the maximum electrical field strength that can be sustained at the most critical point in the field without inducing electrical breakdown, typically at the point of injection. But the presence of a maximum field at the beginning of the EHD conversion channel limits performance severely because the rest of the channel operates below maximum capacity, i.e., the electric pressure is at its allowable limit in only a small fraction of the conversion channel.

Therefore, it is desired to achieve greater power output per unit volume of channel by having a channel in which the local field strength is everywhere uniform close to the critical limit.

SUMMARY OF THE INVENTION

Accordingly, the present invention provides a uniform maximum loading throughout an EHD conversion channel. The channel is in the form of a slender nozzle of a geometrical shape defined by the following pair of parametric equations:

$$\frac{r}{r_1} = \left[ \frac{1 + \frac{\gamma - 1}{2} M^2}{\frac{\gamma + 1}{2}} \right]^{-\frac{(\gamma+1)}{4(\gamma-1)}} \frac{1}{\sqrt{M}} \text{ and}$$

$$\frac{z}{\lambda} = \frac{1}{\gamma - 1} \ln\left[ 1 + \frac{\gamma - 1}{2} M^2 \right]$$

where
 r = nozzle radius at station z
 $r_1$ = nozzle radius at throat
 $\gamma$ = ratio of specific heats
 M = Mach number at station z
 $\lambda$ = characteristic length
 z = axial coordinate Therefore, it is an object of the present invention to have the electric pressure at its allowable limit everywhere along the conversion channel of an EHD power generator.

Other objects, advantages and novel features of the present invention will be apparent from the following detailed specification and appended claims when read in view of the drawing.

BRIEF DESCRIPTION OF THE DRAWING

The FIGURE is a schematic of an optimum EHD generator according to the present invention.

DESCRIPTION OF THE PREFERRED EMBODIMENT

The geometrical, electrical and thermodynamic features of an EHD power generator are governed by various physical laws of which the most significant in the present context is Poisson's equation as it applies to an electric field. By restricting attention to configurations having polar symmetry and having radial dimensions small in comparison with their axial length, Poisson's equation may be simplified to a one-dimensional approximation which shows basic trends simply and clearly.

Also, the laws of fluid flow must be considered in their common one-dimensional forms. The flow through the channel of an EHD power generator is treated as isentropic with the ratio of specific heats, $\gamma$, being considered constant.

Since the drop in total temperature through the channel is normally very small in comparison with the absolute total temperature $T_o$ at the channel inlet, for analytic purpose this temperature drop is neglected and the flow through the channel is approximated as an isentropic flow of constant total temperature. Typically the total temperature change is less than 3%.

At optimum EHD generator has an electric field which does not change sign from inlet to outlet; thus the electric field is always negative for positive space charge and positive for negative space charge and $$E = -\sigma |E| \qquad (1)$$

where
 $\sigma = +1$ positively charged particles
 $\sigma = -1$ negatively charged particles The field strength at breakdown has been established over a broad range to be well represented by the simple linear law:

$$|E_B| = C_o + C_B R \rho \tag{2}$$

where $C_o$ and $C_B$ are characteristics of the medium, which happen to have the same numerical values for both air and steam, and R is the gas constant. The local field strength is to be everywhere just equal to its critical value at impending breakdown, and using well known relations for one-dimensional flow the expression for the necessary density charge is:

$$\frac{1}{\rho} \frac{d\rho}{dz} = \frac{q}{\epsilon C_B R} \tag{3}$$

where q = electrical charges per unit mass
$\epsilon = \epsilon_o$ = electrical permitivity of free space The reciprocal of the quantity on the right of equation (3) identifies a significant characteristic length $\lambda$ where $$\lambda = \frac{\epsilon C_B R}{q} \tag{4}$$

or $$\lambda q = \lambda_{min} q_{max} = \epsilon C_B R = \text{constant} \tag{5}$$

Since $\epsilon C_B R$ is a characteristic of the medium, once the medium is chosen this constant is fixed. Therefore to maintain the electrical loading at incipient breakdown the product $\lambda q$ must remain constant. There is some practical upper limit $q_{max}$ that can be achieved for any specific type of design and a corresponding lower limit $\lambda_{min}$ on the accompanying longitudinal characteristic length.

Upon substituting $\lambda$ into expression (3) and integrating, the following important result is obtained:

$$\frac{\rho}{\rho_o} = e^{-\frac{z}{\lambda}} \tag{6}$$

which reveals that the density continues to drop monotonically with increasing distance downstream. Thus the flow corresponds to the known isentropic flow through a converging-diverging nozzle for which the walls are so designed that the density drops exponentially as specified by expression (6).

Let subscript 1 denote the throat of the nozzle. Then the following relations are known to apply:

$$\frac{\rho}{\rho_o} = \left[1 + \frac{\gamma - 1}{2} M^2\right]^{-\frac{1}{\gamma-1}} \tag{7}$$

$$\frac{r}{r_1} = \left[\frac{1 + \frac{\gamma-1}{2} M^2}{\frac{\gamma+1}{2}}\right]^{\frac{\gamma+1}{4(\gamma-1)}} \frac{1}{\sqrt{M}} \tag{8}$$

where

M = Mach number at station z
r = nozzle radius at station z
$r_1$ = nozzle radius at throat From expressions (6) and (7) it is deduced that:

$$\frac{z}{\lambda} = \frac{1}{\gamma - 1} \ln\left[ + \frac{\gamma - 1}{2} M^2\right] \tag{9}$$

Expressions (8) and (9) now constitute a pair of parametric equations for $r/r_1$ as a function of $z/\lambda$ with Mach number as a parameter. These expressions define the shape of the optimum nozzle having uniform loading just below breakdown all along its length.

The shape of a typical optimum slender EHD nozzle is represented in the FIGURE for $\gamma = 1.3$, which is a reasonably good approximation for steam. The data for the FIGURE are represented by the following Table:

| OPTIMUM SLENDER EHD NOZZLE | | |
|---|---|---|
| | $\gamma = 1.3$ | |
| M | $z/\lambda$ | $r/r_1$ |
| 0.20 | 0.0199 | 1.7303 |
| 0.60 | 0.1753 | 1.0924 |
| 1.00 | 0.4659 | 1.0000 |
| 1.40 | 0.8591 | 1.0596 |
| 1.80 | 1.3203 | 1.2182 |
| 2.20 | 1.8194 | 1.4682 |
| 2.60 | 2.3337 | 1.8153 |
| 3.00 | 2.8481 | 2.2715 |

An injector (not shown) located at station 0 inputs unipolar-charged particles into the fluid flow which axially traverses an optimum nozzle, and a collector (not shown) located at station 2 collects the charged particles from the fluid flow. The optimum nozzle is a converging-diverging type as indicated above with the throat indicated at station 1. An electrical LOAD is connected between the injector and the collector to provide a closed loop electrical path to produce useful electrical work, i.e., power.

The theoretical power output is $$P_e = i(\phi_2 - \phi_i) \tag{10}$$

or $$\frac{P_e}{\epsilon C_B{}^2 R^2 \rho_o{}^2 a_o A_1} = \left\{\left(\frac{C_o}{C_B R \rho_o}\right)\left(\frac{z_2 - z_i}{\lambda}\right) + \left[e^{\frac{-z_i}{\lambda}} - e^{\frac{-z_2}{\lambda}}\right]\right\} \left(\frac{2}{\gamma+1}\right)^{\frac{\gamma+1}{2(\gamma-1)}} \tag{11}$$

where the subscript i indicates the injector axial location. This result shows how the theoretical gross power output of the optimum nozzle depends upon the various physical and geometrical parameters. Holding the nozzle shape constant and varying the absolute size, i.e., varying the characteristic length $\lambda$, then for $\lambda \geq \lambda_{min}$ $$i \sim \lambda^{-1} \tag{12}$$

$$(\phi_2 - \phi_i) \sim \lambda \tag{13}$$

$$P_e \sim \lambda^o = \text{independent of } \lambda \tag{14}$$

These result because of the limitations imposed by the electrical breakdown phenomenon. Since voltages tend to be inconveniently high in EHD devices, making the devices small with $\lambda$ as close to $\lambda_{min}$ as feasible reduces this problem without any corresponding decrease in power output.

Thus, the present invention provides an optimum slender EHD nozzle in which the local field strength is everywhere uniformly close to incipient breakdown to produce maximum power output. This optimum shape produces twice as much electric work per unit mass of fluid as the best uniform channel design.

What is claimed is:

1. In an electrohydrodynamic power generator of the type having an injector located upstream of the input to a conversion channel for injecting charged particles into a fluid stream to form a charged aerosol flow through said conversion channel, a collector located downstream of said injector to remove said charged particles and an electric field impressed across said conversion channel which opposes the fluid motion, the improvement being a converging-diverging conversion channel wherein the section of said channel downstream from the injector has the geometric shape defined by the pair of parametric equations:

$$\frac{r}{r_1} = \left[ \frac{1 + \frac{\gamma - 1}{2} M^2}{\frac{\gamma + 1}{2}} \right]^{-\frac{(\gamma+1)}{4(\gamma-1)}} \frac{1}{\sqrt{M}} \text{ and}$$

$$\frac{z}{\lambda} = \frac{1}{\gamma - 1} \ln \left[ 1 + \frac{\gamma - 1}{2} M^2 \right]$$

where
 $r$ = radius at axial location z,
 $r_1$ = radius at nozzle throat,
 $\lambda$ = longitudinal characteristic length for the fluid stream,
 $\gamma$ = ratio of specific heats,
 $M$ = Mach number at axial location z, and
 $z$ = axial coordinate.

* * * * *